(12) United States Patent
Santiago

(10) Patent No.: US 8,531,282 B1
(45) Date of Patent: Sep. 10, 2013

(54) VEHICLE BUMPER GUARD AND MONITORING ASSEMBLY

(76) Inventor: William Santiago, Jersey City, NJ (US)

( * ) Notice: Subject to any disclaimer, the term of this patent is extended or adjusted under 35 U.S.C. 154(b) by 137 days.

(21) Appl. No.: 13/279,462

(22) Filed: Oct. 24, 2011

(51) Int. Cl.
*B60Q 1/00* (2006.01)

(52) U.S. Cl.
USPC ........... 340/436; 340/435; 340/605; 340/612; 340/614; 293/119; 293/132

(58) Field of Classification Search
USPC ......... 340/435, 436, 605, 612, 614; 293/119, 293/132
See application file for complete search history.

(56) References Cited

U.S. PATENT DOCUMENTS

| 508,222 | A | 11/1893 | Hoffman |
| 3,378,296 | A | 4/1968 | Crocker |
| 5,618,073 | A | 4/1997 | Criscione |
| 6,572,163 | B1 | 6/2003 | Pickett |
| 6,637,790 | B2 | 10/2003 | Bio |
| 7,073,830 | B1 | 7/2006 | Chen et al. |
| 7,364,222 | B2 * | 4/2008 | Tanabe ...................... 296/187.03 |
| 7,804,414 | B2 * | 9/2010 | Kiribayashi .................. 340/614 |
| 2011/0004339 | A1 * | 1/2011 | Ozick et al. .................... 700/245 |

* cited by examiner

*Primary Examiner* — Tai T Nguyen

(57) ABSTRACT

A vehicle bumper guard and monitoring assembly is provided for protecting the bumper area of a vehicle, monitoring the surrounding area, and providing an alert upon detection of contact with the bumper guard. The assembly includes a sheet having opposed ends. The sheet is configured for conforming to a bumper of a vehicle. A plurality of hooks is coupled to and extends from the sheet. Each hook is configured for securing to the vehicle whereby the sheet is positioned over the bumper of the vehicle. A plurality of sensors is coupled to the sheet. Each sensor is configured to detect contact or imminent contact between an object and the bumper of the vehicle. A transmitter is operationally coupled to the sensors to transmit an alert signal when contact is detected between the object and the bumper of the vehicle.

17 Claims, 4 Drawing Sheets

VEHICLE BUMPER GUARD AND MONITORING ASSEMBLY

BACKGROUND OF THE DISCLOSURE

Field of the Disclosure

The disclosure relates to vehicle monitoring devices and more particularly pertains to a new vehicle monitoring device for protecting the bumper area of a vehicle, monitoring the surrounding area, and providing an alert upon detection of contact with the bumper guard.

SUMMARY OF THE DISCLOSURE

An embodiment of the disclosure meets the needs presented above by generally comprising a sheet having opposed ends. The sheet is configured for conforming to a bumper of a vehicle. A plurality of hooks is coupled to and extends from the sheet. Each hook is configured for securing to the vehicle whereby the sheet is positioned over the bumper of the vehicle. A plurality of sensors is coupled to the sheet. Each sensor is configured to detect contact or imminent contact between an object and the bumper of the vehicle. A transmitter is operationally coupled to the sensors to transmit an alert signal when contact is detected between the object and the bumper of the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 5:
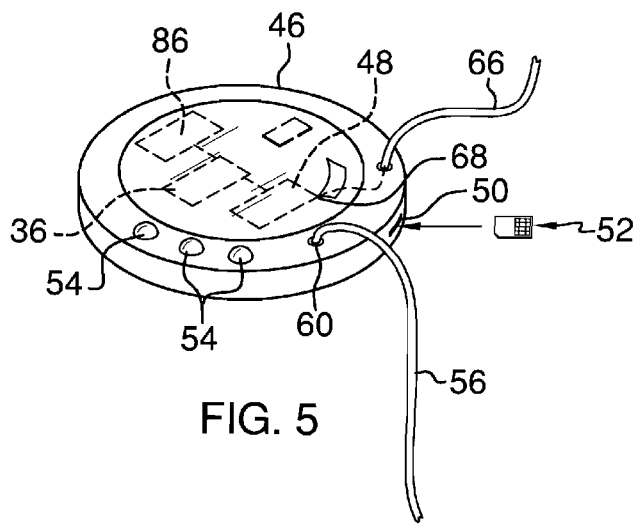
FIG. 5 is a top front side perspective view of an embodiment of the disclosure.
Figure 1:
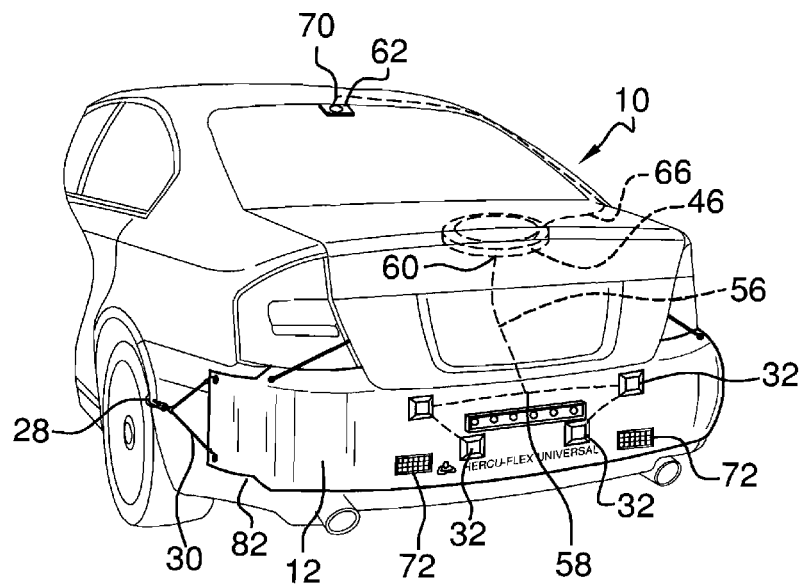
FIG. 1 is a top front side perspective view of a vehicle bumper guard and monitoring assembly according to an embodiment of the disclosure.
Figure 2:
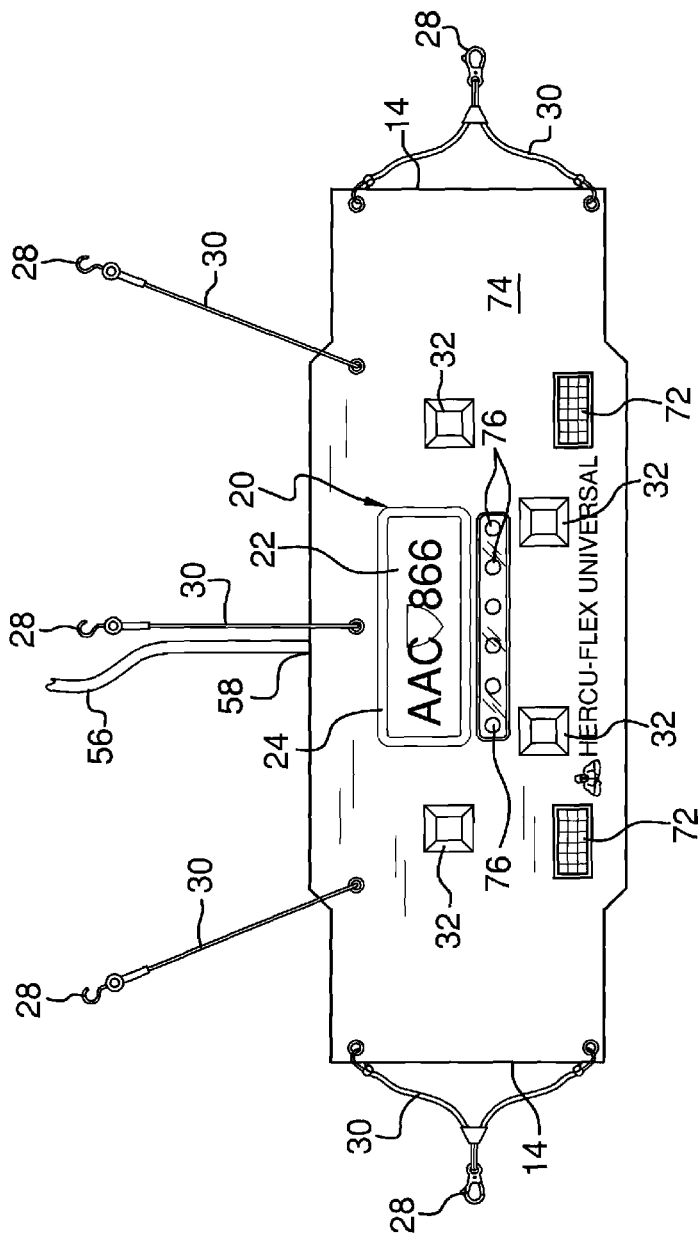
FIG. 2 is a front view of an embodiment of the disclosure.
Figure 3:
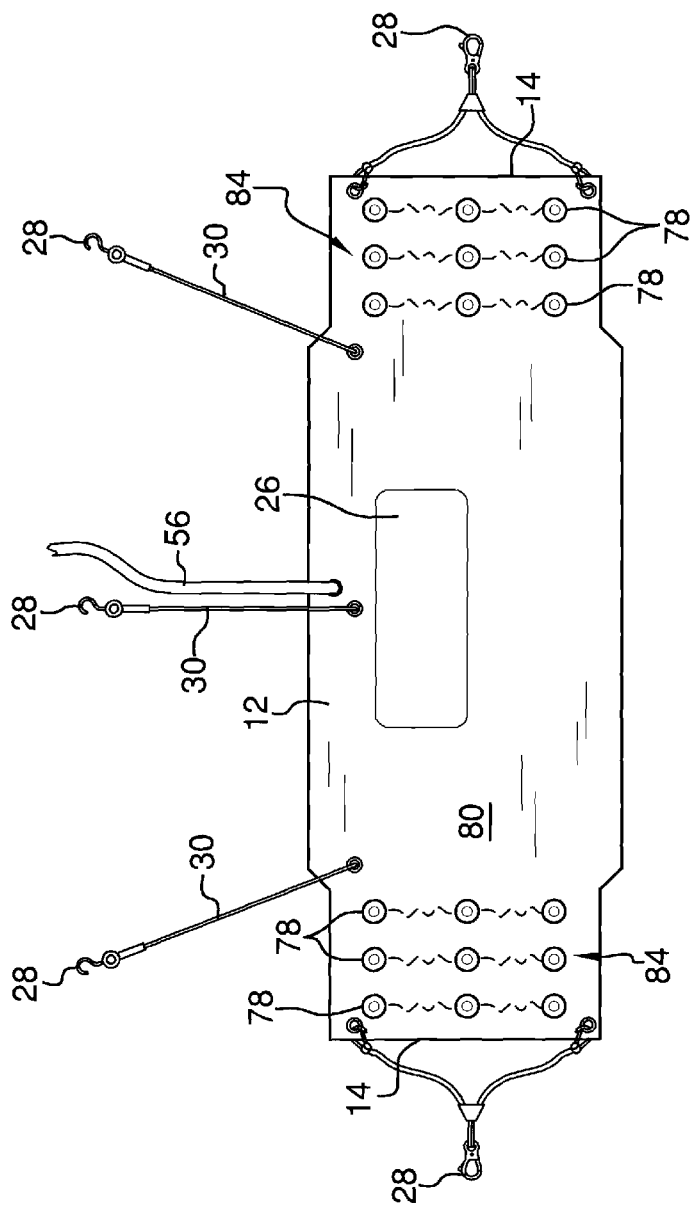
FIG. 3 is a back view of an embodiment of the disclosure.
Figure 4:
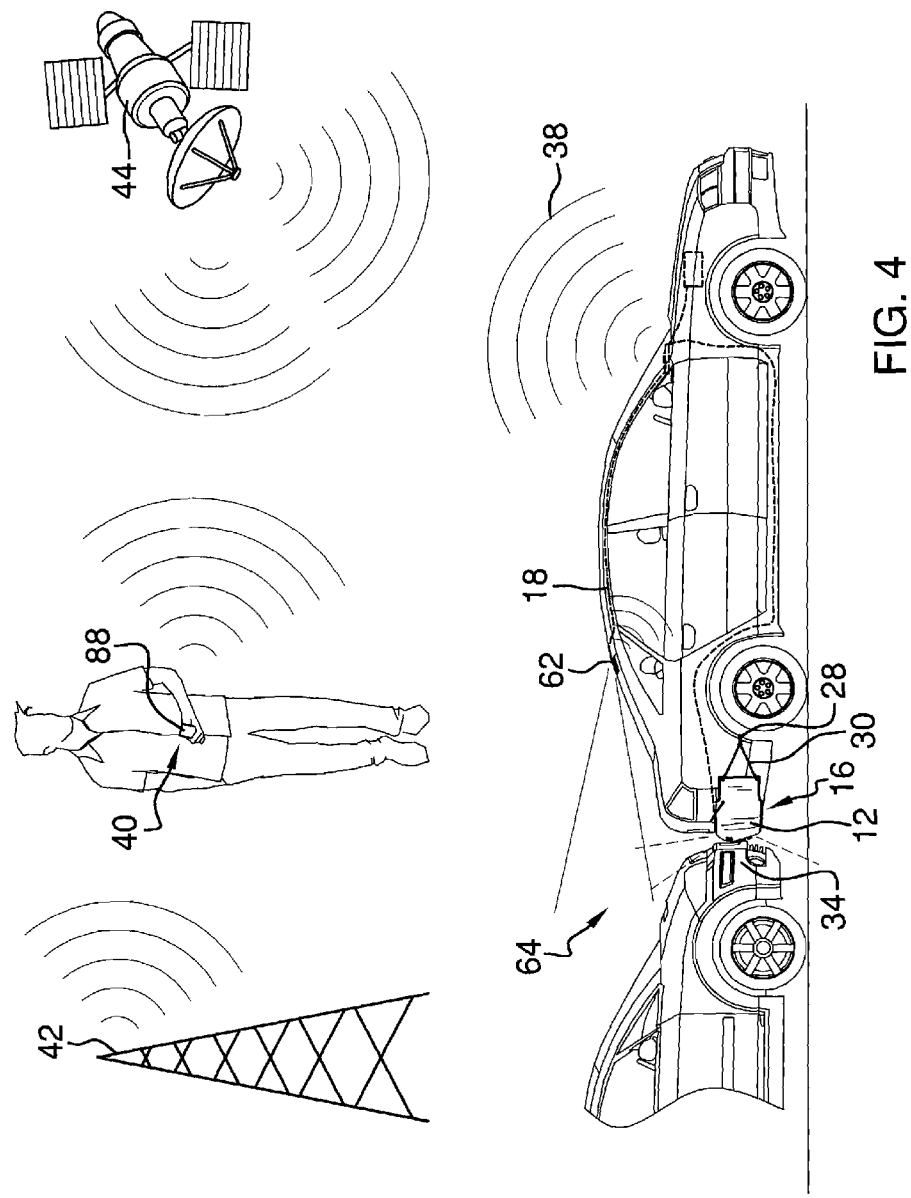
FIG. 4 is a side view of an embodiment of the disclosure in use.

With reference now to the drawings, and in particular to FIGS. 1 through 5 thereof, a new vehicle monitoring device embodying the principles and concepts of an embodiment of the disclosure and generally designated by the reference numeral 10 will be described.

As best illustrated in FIGS. 1 through 5, the vehicle bumper guard and monitoring assembly 10 generally comprises a rubber sheet 12 having opposed ends 14. The sheet 12 is configured for conforming to a bumper 16 of a vehicle 18. The sheet 12 has a transparent central section 20 configured for positioning over a license plate 22 whereby the license plate 22 is visible through the central section 20 when the sheet 12 is coupled to the bumper 16. The central section 20 may be achieved either through a clear panel 24 or an opening 26 through the sheet 12.

A plurality of hooks 28 is coupled to and extends from the sheet 12. The hooks 28 may be attached using elastic cords 30. Each hook 28 is configured for securing to the vehicle 18 whereby the sheet 12 is positioned over the bumper 16 of the vehicle 18.

A plurality of sensors 32 is coupled to the sheet 12. Each sensor 32 is configured to detect contact between an object 34, such a second vehicle, and the bumper 16 of the vehicle 18. The sensors 32 may utilize various known technologies for detection such as monitoring physical contact, proximity, vibration, or the like. A transmitter 36 is operationally coupled to the sensors 32. The transmitter 36 transmits an alert signal 38 when contact is detected between the object 34 and the bumper 16 of the vehicle 18. The alert signal 38 may be a telephonic message communicated to a remote device 40 through a cellular tower 42 or a satellite 44. The alert signal 38 may alternately take the form of a communication to a computer, smartphone, or other device connected to the internet or through a cellular technology network. A housing 46 is provided. The transmitter 36 is positioned in the housing 46. A processor 48 is also positioned in the housing 46. The processor 48 is operationally coupled to the transmitter 36 and the sensors 32. The processor 48 may be programmed to provide adjustable sensitivities for the sensors and control the form and method of transmission of the alert signal 38. A slot 50 may be positioned in the housing 46. A memory card 52 is insertable through the slot 50 in the housing 46. The memory card 52 is selectively operationally coupled to the processor 48.

A plurality of housing lights 54 may be coupled to the housing 46 and operationally coupled to the processor 48 for selectively being illuminated by the processor 48. The housing lights 54 may be provided in multiple colors and utilized to indicate the assembly 10 is activated, deactivated, transmitting the alert signal 38, or other to communicate other variable status indicators depending on the programming of the processor 48. A first wire 56 has a first end 58 coupled to the sheet 12 and a second end 60 coupled to the housing 46. The first end 58 of the first wire 56 is electrically coupled to the sensors 32 and the second end 60 is electrically coupled to the processor 48. A camera 62 is configured for coupling to the vehicle 18 and further configured for monitoring or displaying an area 64 proximate the vehicle 18. The camera 62 is operationally coupled to the processor 48 to input data which may be analyzed and utilized to determine whether the alert signal 34 is to be transmitted. A second wire 66 has a first end 68 coupled to the housing 46 and a second end 70 coupled to the camera 62. The first end 68 of the second wire 66 is electrically coupled to the processor 48 and the second end 70 of the second wire 66 is electrically coupled to the camera 62.

A reflector 72 may be coupled to an outer face 74 of the sheet 12. A plurality of sheet lights 76 may also be coupled to the sheet 12 to enhance visibility. The sheet lights 76 may be selectively illuminated by the processor 48 if so desired when the alert signal 34 is transmitted. A plurality of suction cups 78 are coupled to an inner face 80 of the sheet 12. The suction cups 78 are configured for coupling to an outer surface 82 of the vehicle 18. The suction cups 78 may be arranged into a pair of cup arrays 84. Each of the cup arrays 84 is positioned proximate an associated one of the opposed ends 14 of the sheet 12.

A receiver 86 is also positioned in the housing 46. The receiver 86 is operationally coupled to the processor 48 whereby the receiver 86 is configured for communications between the processor 48 and a remote communications device 88. Thus, the area 64 may be remotely monitored on the device 88 in accordance with a conventional smart-phone or tablet computer application. Utilization of the transmitter 36 and receiver 86 further permits remote changing of settings relating to conditions necessary to trigger transmission of the alert signal 34.

In use, the sheet 12 provides a physical barrier for enhanced physical protection of the bumper 16 of the vehicle 18. The sensors 32 and camera 62 provide monitoring while the transmitter 36 and receiver 86 provide communication managed by the processor 48.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A bumper guard and vehicle monitoring assembly comprising:
   a sheet, said sheet having opposed ends, said sheet being configured for conforming to a bumper of a vehicle;
   a plurality of hooks, each hook being coupled to and extending from said sheet, each hook being configured for securing to the vehicle whereby said sheet is positioned over the bumper of the vehicle;
   a plurality of sensors coupled to said sheet, each sensor being configured to detect contact between an object and the bumper of the vehicle; and
   a transmitter, said transmitter being operationally coupled to said sensors, said transmitter transmitting an alert signal when contact is detected between the object and the bumper of the vehicle.

2. The assembly of claim 1, further comprising:
   a housing, said transmitter being positioned in said housing; and
   a processor positioned in said housing, said processor being operationally coupled to said transmitter and said sensors.

3. The assembly of claim 2, further comprising:
   a slot positioned in said housing; and
   a memory card insertable through said slot in said housing, said memory card being selectively operationally coupled to said processor.

4. The assembly of claim 2, further including a plurality of housing lights coupled to said housing, said housing lights being operationally coupled to said processor for selectively being illuminated by said processor.

5. The assembly of claim 2, further including a first wire, a first end of said first wire being coupled to said sheet, a second end of said first wire being coupled to said housing, said first end of said first wire being electrically coupled to said sensors, said second end of said first wire being electrically coupled to said processor.

6. The assembly of claim 2, further including a camera configured for coupling to the vehicle, said camera being configured for monitoring an area proximate the vehicle, said camera being operationally coupled to said processor.

7. The assembly of claim 6, further including a second wire, a first end of said second wire being coupled to said housing, a second end of said second wire being coupled to said camera, said first end of said second wire being electrically coupled to said processor, said second end of said second wire being electrically coupled to said camera.

8. The assembly of claim 1, further including a reflector coupled to an outer face of said sheet.

9. The assembly of claim 1, further including said sheet being constructed of rubber.

10. The assembly of claim 1, further including said sheet having a transparent central section configured for positioning over a license plate whereby the license plate is visible through said central section when said sheet is coupled to the bumper.

11. The assembly of claim 1, further including a plurality of sheet lights coupled to said sheet.

12. The assembly of claim 1, further including a plurality of suction cups coupled to an inner face of said sheet, said suction cups being configured for coupling to an outer surface of the vehicle.

13. The assembly of claim 12, further including said suction cups being arranged into a pair of cup arrays, each of said cup arrays being positioned proximate an associated one of said opposed ends of said sheet.

14. The assembly of claim 1, wherein said alert signal is a telephonic message.

15. The assembly of claim 1, wherein said alert signal is communicated to a remote device.

16. The assembly of claim 1, further including a receiver, said receiver being positioned in said housing, said receiver being operationally coupled to said processor whereby said receiver is configured for communications between said processor and a remote communications device.

17. A bumper guard and vehicle monitoring assembly comprising:
   a rubber sheet, said sheet having opposed ends said sheet being configured for conforming to a bumper of a vehicle, said sheet having a transparent central section configured for positioning over a license plate whereby the license plate is visible through said central section when said sheet is coupled to the bumper;
   a plurality of hooks, each hook being coupled to and extending from said sheet, each hook being configured for securing to the vehicle whereby said sheet is positioned over the bumper of the vehicle;
   a plurality of sensors coupled to said sheet, each sensor being configured to detect contact between an object and the bumper of the vehicle;
   a transmitter, said transmitter being operationally coupled to said sensors, said transmitter transmitting an alert signal when contact is detected between the object and the bumper of the vehicle, said alert signal being a telephonic message communicated to a remote device;
   a housing, said transmitter being positioned in said housing;
   a processor positioned in said housing, said processor being operationally coupled to said transmitter and said sensors;

a slot positioned in said housing;

a memory card insertable through said slot in said housing, said memory card being selectively operationally coupled to said processor;

a plurality of housing lights coupled to said housing, said housing lights being operationally coupled to said processor for selectively being illuminated by said processor;

a first wire, a first end of said first wire being coupled to said sheet, a second end of said first wire being coupled to said housing, said first end of said first wire being electrically coupled to said sensors, said second end of said first wire being electrically coupled to said processor;

a camera configured for coupling to the vehicle, said camera being configured for monitoring an area proximate the vehicle, said camera being operationally coupled to said processor;

a second wire, a first end of said second wire being coupled to said housing, a second end of said second wire being coupled to said camera, said first end of said second wire being electrically coupled to said processor, said second end of said second wire being electrically coupled to said camera;

a reflector coupled to an outer face of said sheet;

a plurality of sheet lights coupled to said sheet;

a plurality of suction cups coupled to an inner face of said sheet, said suction cups being configured for coupling to an outer surface of the vehicle, said suction cups being arranged into a pair of cup arrays, each of said cup arrays being positioned proximate an associated one of said opposed ends of said sheet; and a receiver, said receiver being positioned in said housing, said receiver being operationally coupled to said processor whereby said receiver is configured for communications between said processor and a remote communications device.

\* \* \* \* \*